United States Patent
Kim

(10) Patent No.: US 8,119,281 B2
(45) Date of Patent: Feb. 21, 2012

(54) SECONDARY BATTERY

(75) Inventor: Bong-Young Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 415 days.

(21) Appl. No.: 12/251,763

(22) Filed: Oct. 15, 2008

(65) Prior Publication Data

US 2009/0111017 A1 Apr. 30, 2009

(30) Foreign Application Priority Data

Oct. 26, 2007 (KR) .................. 10-2007-0108343

(51) Int. Cl.
*H01M 2/02* (2006.01)
*H01M 2/08* (2006.01)

(52) U.S. Cl. ...................... 429/178; 429/185

(58) Field of Classification Search ............ 429/178, 429/185
See application file for complete search history.

(56) References Cited

U.S. PATENT DOCUMENTS

| 6,979,502 B1 | 12/2005 | Gartstein et al. | |
|---|---|---|---|
| 2003/0108780 A1* | 6/2003 | Iwaizono et al. | 429/7 |
| 2005/0014064 A1* | 1/2005 | Matsubara | 429/180 |

FOREIGN PATENT DOCUMENTS

| JP | 9-129192 | 5/1997 |
|---|---|---|
| JP | 2002-124248 | 4/2002 |
| JP | P2002-151029 A | 5/2002 |
| JP | 2004-006115 | 1/2004 |
| JP | P2004-265722 A | 9/2004 |
| JP | 2005-235696 | 9/2005 |
| KR | 2002-95025 | 12/2002 |
| KR | 20-326889 | 9/2003 |

OTHER PUBLICATIONS

Korean Notice of Allowance issued Nov. 27, 2009 in corresponding Korean Patent Application No. 10-2007-0108343.
Korean Office Action issued on Aug. 7, 2009 in the corresponding Korean Patent Application No. 10-2007-0108343.

* cited by examiner

*Primary Examiner* — Karie O'Neill Apicella
(74) *Attorney, Agent, or Firm* — Christie, Parker & Hale, LLP

(57) ABSTRACT

The secondary battery includes: a can, and electrode assembly disposed in the can; a protection circuit board disposed around an opening of the can, including an external connection terminal; a double-coated adhesive tape interposed between the can and the protection circuit board; a cap assembly including a cap-up, to seal the opening of the can; a first lead connected to the protection circuit board and welded to the cap-up; a second lead connected to the protection circuit board and welded to a bead of the can; and a top cover having a terminal hole corresponding to the external connection terminal.

15 Claims, 7 Drawing Sheets

SECONDARY BATTERY

CROSS-REFERENCE TO RELATED APPLICATION

This application claims the benefit of Korean Patent Application No. 2007-108343, filed Oct. 26, 2007, in the Korean Intellectual Property Office, the disclosure of which is hereby incorporated herein by reference in its entirety.

BACKGROUND OF THE INVENTION

1. Field of the Invention

Aspects of the present invention relate to a secondary battery, and more particularly, to a secondary battery that is free from appearance imperfections resulting from welding.

2. Description of the Related Art

In general, lightweight, high-performance portable devices, such as video cameras, mobile phones, notebook computers, and so on, use secondary batteries as portable power sources. Secondary batteries include nickel-cadmium batteries, nickel-hydrogen batteries, nickel-zinc batteries, lithium secondary batteries, and so on. Lithium secondary batteries have become popular power sources because they are compact, have a large capacity, a high operating voltage, and a high energy density per unit weight.

A lithium secondary battery can be formed by: inserting an electrode assembly, including a positive electrode plate, a negative electrode plate, and a separator, into a can; attaching a protection circuit board to the electrode assembly; sealing an opening of the can with a cap assembly, and covering the can with a cover or label.

The lithium secondary batteries are classified as cylindrical, prismatic, or pouch-type, depending on the shape of the can accommodating the electrode assembly. A lithium secondary battery includes an electrode lead to electrically connect the electrode assembly to the protection circuit board. In cylindrical batteries, the electrode lead can be welded to the can, to form an electrical connection to the electrode assembly.

When the welding is performed at the bottom part of the can, since the electrode lead is elongated along side surfaces of the can, an adhesive tape is needed to attach the bare cell to the electrode lead. In addition, since the can is formed of an aluminum material, the aluminum material may be damaged, due to pressure and heat during the welding, which can affect the appearance of the secondary battery. Further, when the protection circuit board is installed at the top end of the can, since the cap-up is below the protection circuit board, due to the thickness of the protection circuit board, it is difficult to use the cap-up as an external terminal.

SUMMARY OF THE INVENTION

Aspects of the present invention provide a secondary battery including an electrode lead that is welded to a bead or a crimping part of a can, to electrically connect a protection circuit board to an electrode assembly disposed in the can.

According to an aspect of the present invention, a secondary battery includes: a can; an electrode assembly disposed in the can; a cap assembly to seal an opening of the can, including a cap-up that extends away from the electrode assembly; a protection circuit board disposed on the can, having an external connection terminal; a double-coated adhesive tape interposed between the can and the protection circuit board; a first lead connected to the protection circuit board and welded to the cap-up; a second lead connected to the protection circuit board and welded to a bead of the can; and a top cover having a terminal hole, through which the external connection terminal is exposed.

According to another aspect of the present invention, a secondary battery includes: a can; an electrode assembly disposed in the can; a cap assembly to seal an opening of the can, including a cap-up that extends away from the electrode assembly; a protection circuit board disposed on the can, having an external connection terminal; a double-coated adhesive tape interposed between the can and the protection circuit board; a first lead connected to the protection circuit board and welded to the cap-up; a second lead connected to the protection circuit board and welded to a crimping part of the can; and a top cover having a terminal hole, through which the external connection terminal is exposed.

According to still another aspect of the present invention, a secondary battery having a protection circuit disposed above a cap assembly is provided. The cap assembly has a cap-up that extends past the protection circuit board.

According to yet another aspect of the present invention, a secondary battery includes: a can; an electrode assembly disposed in the can; a cap assembly to seal an opening of the can, including a cap-up that extends away from the electrode assembly; a protection circuit board disposed around the opening of the can; a double-coated adhesive tape interposed between the can and the protection circuit board; a terminal plate disposed on the cap-up, above the protection circuit board; and first and second leads electrically connecting the protection circuit board with the electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
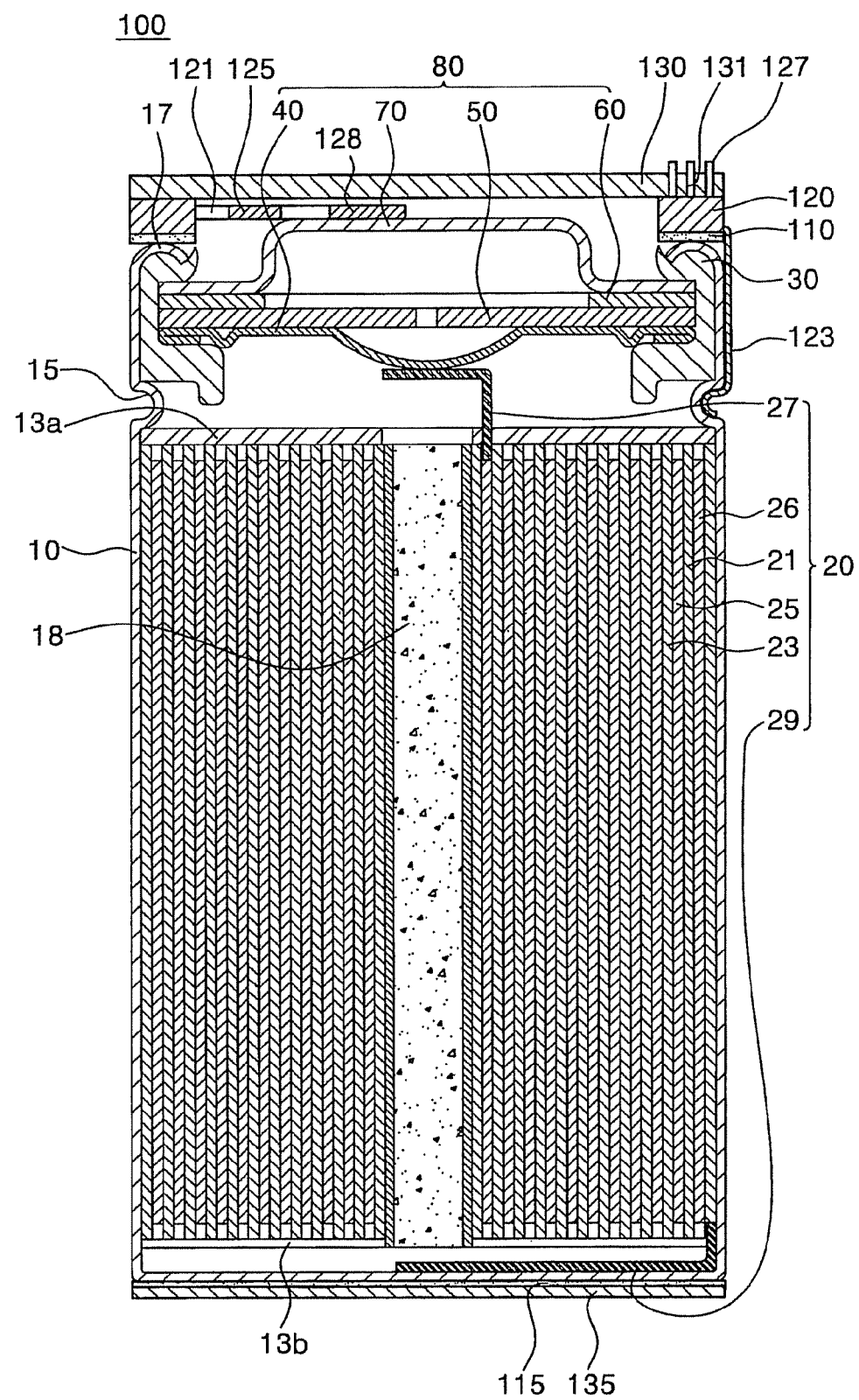
FIG. 1 is a cross-sectional view of a battery pack according to a first exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. As referred to herein, when a first element is said to be disposed "on", or adjacent to, a second element, the first element can directly contact the second element, or can be separated from the second element by one or more other elements can be located therebetween. In contrast, when an element is referred to as being disposed "directly on" another element, there are no intervening elements present. As used herein, the term "and/or" includes any and all combinations of one or more of the associated listed items.

Figure 2:
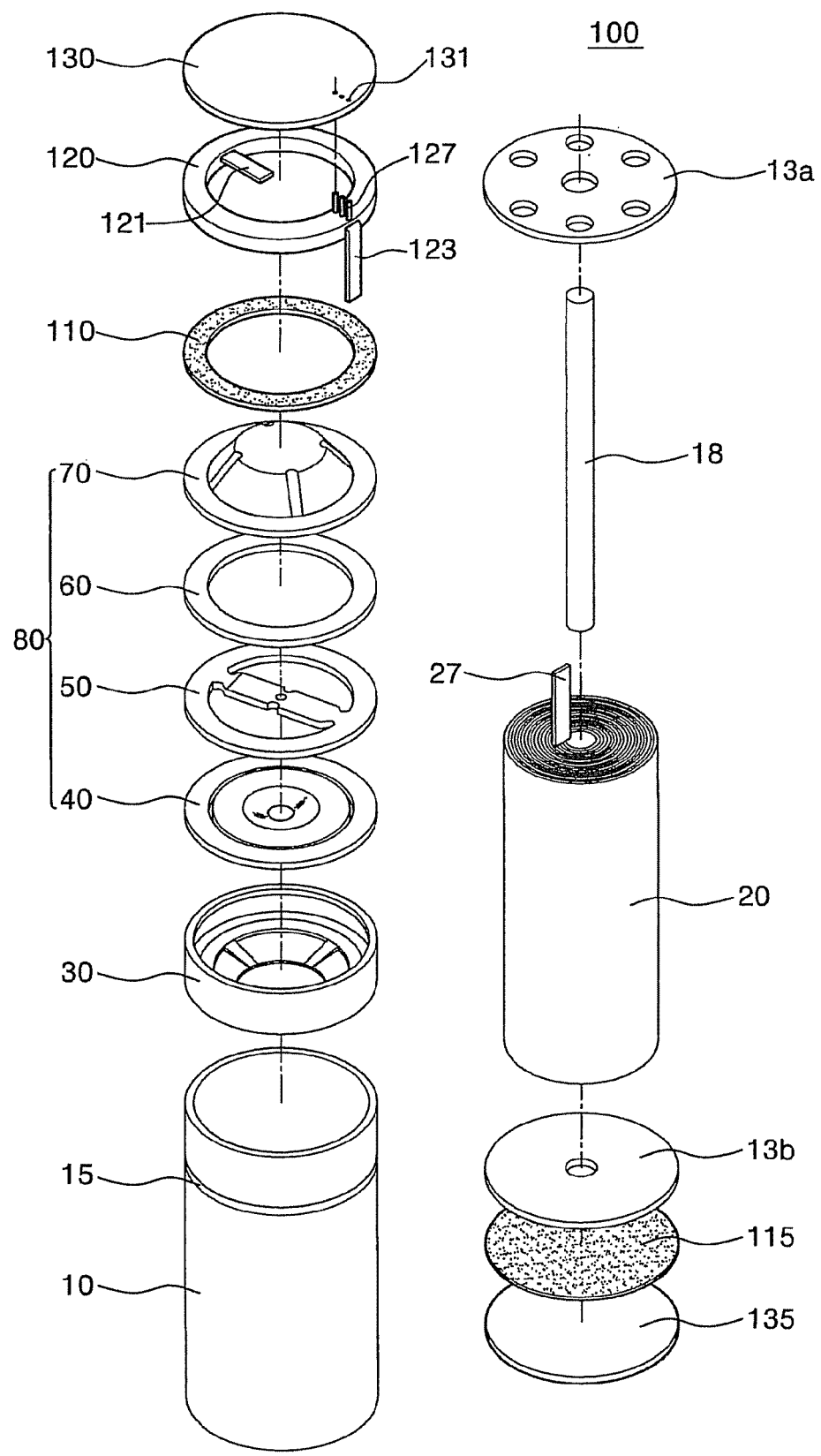
FIG. 2 is an exploded perspective view of the battery pack of FIG. 1.

FIG. 1 is a cross-sectional view of a secondary battery 100, according to a first exemplary embodiment of the present invention, and FIG. 2 is an exploded perspective view of the secondary battery 100. Referring to FIGS. 1 and 2, the secondary battery 100 includes an electrode assembly 20, a can 10 to house the electrode assembly 20, and a cap assembly 80 to seal an opening of the can 10. The electrode assembly 20 includes first and second electrode plates 25, 26 and a separator 21 disposed therebetween, which are wound together. The electrode assembly 20 can also include an optional second separator 23.

The electrode plates 25, 26 are formed by applying an active material slurry to a collector (not shown) formed of metal foil or mesh, which can be made of aluminum or copper. The slurry is generally formed by mixing an active material, an auxiliary conductor, a binder, and a plasticizer, in a solvent. The solvent is removed in a subsequent process.

The electrode plates 25, 26 have non-coating portions where the slurry is not applied, and to which electrode tabs can be attached. For example, a first electrode tab 27 is connected to a non-coating portion of the electrode assembly 20 and to the cap assembly 80, and a second electrode tab 29 is connected to a non-coating portion and the bottom of the can 10.

The can 10 is generally formed of, stainless steel, aluminum, or an aluminum alloy, by deep drawing. The electrode assembly 20 is inserted into the can 10, through the opening. A bottom insulating plate 13b can be disposed on the bottom surface of the electrode assembly 20, and the second electrode tab 29 can be separated from the bottom insulating plate 13b. The bottom insulating plate 13b and the electrode assembly 20 can be inserted into the can 10, sequentially, or as a unit.

The electrode assembly 20 has a hollow center. The bottom insulating plate 13b has a through hole that faces the hollow center of the electrode assembly 20. The second electrode tab 29 is bent to extend across the through hole of the bottom insulating plate 13b.

A welding rod (not illustrated) can be inserted into the hollow center of the electrode assembly 20, to weld the second electrode tab 29 to the bottom surface of the can 10. Thus, the can 10 has the same polarity as the second electrode tab 29 and may serve as an electrode terminal.

A center pin 18 is installed into the hollow center of the electrode assembly 20. The center pin 18 reinforces the electrode assembly 20 and serves as a path through which gas generated by the electrode assembly can be exhausted.

A top insulating plate 13a is installed on an upper surface of the electrode assembly 20. The first electrode tab 27 projects up through a hole defined in the top insulating plate 13a. The top insulating plate can also have a central hole that corresponds to the hollow center of the electrode assembly 20, through which the second electrode tab 29 may be welded.

A bead 15 is formed in the can 10, by crimping a sidewall of the can 10 adjacent to the top of the electrode assembly 20. The bead 15 secures the electrode assembly 20 within the can 10.

An electrolyte can then be injected into the can 10, through the opening. The electrolyte injection may be performed before beading. A gasket 30 is inserted into the opening of the can 10, and the cap assembly 80 is inserted inside the gasket 30.

The cap assembly 80 includes a vent 40, a current interrupt device (CID) 50, a positive temperature coefficient (PTC) thermistor 60, and a cap-up 70. One end of the first electrode tab 27 is welded to the vent 40. The components of the cap assembly 80 may be preassembled and then installed on the gasket 30, or may be sequentially installed on the gasket 30. The PCT thermistor 60 can be an optional element. The opening of the can 10 is crimped to form a crimping part 17, in order to seal the can 10 by compressing the gasket 30 against the cap assembly 80.

The can 10 has the same polarity as the second electrode tab 29, which is welded to a bottom portion of the can 10. The cap-up 70 projects away from the electrode assembly 20, and has the same polarity as the first electrode tab 27. In other words, the can 10 and the cap assembly 80 have different polarities.

The secondary battery 100 includes a protection circuit board 120 disposed on the crimping part 17. The protection circuit board 120 protects the secondary battery 100 from overcharges and over discharges. A double-coated adhesive tape 110 is used to attach the protection circuit board 120 to the can 10. The tape 110 can be ring-shaped.

The cap-up 70 can be a terminal to connect the secondary battery 100 to an external device, and extends through the tape 110. In other words, the cap-up 10 extends past the crimping part 17.

The protection circuit board 120 is ring-shaped, and includes first and second leads 121, 123. The first and second leads 121, 123 are electrically connected to the cap-up 70 and the can 10, respectively. The cap-up 70 and the can 10 have different polarities, due to the electrical connections established by the first and second electrode tabs 27, 29.

The first and second leads 121, 123 are formed of nickel. The first lead 121 extends from the protection circuit board 120 to the cap-up 70. The first lead 121 may be plate-shaped and can be attached to an outer surface of the cap-up 70, by resistance welding, for example. The first lead 121 may alternatively be curved, so as to be welded to an inner surface of the cap-up 70. In other words, the first lead 121 may be any shape, so long as it can be electrically connected to the cap-up 70. The first lead 121 can include a PTC thermistor 125 that can short circuit the secondary battery 100, when the secondary battery 100 is overheated.

The second lead 123 is curved along a side surface of the can 10, so as to be welded to the bead 15 of the can 10. In order to adhere the second lead 123 to the can 10, a double-coated adhesive tape (not shown) may be interposed between the second lead 123 and the can 10. Since the second lead 123 is welded to the bead 15, the weld is well protected from external impacts. Moreover, since the welding process is performed inside the bead, the appearance of the secondary battery 100 is not affected by the welding.

The protection circuit board 120 has several external connection terminals 127 projecting upward therefrom, each of which includes a power terminal and a ground terminal to make an electrical connection between the secondary battery 100 and an external device. The protection circuit board 120 may further include an input/output terminal to exchange data with an external device. The protection circuit board 120 can include a thermistor terminal to transfer temperature data to an external device. The protection circuit board 120 includes terminal holes 131, through which the external connection terminals 127 are exposed.

The secondary battery 100 can include a top cover 130 to protect the protection circuit board 120 from external impacts. The secondary battery 100 can also include a bottom cover 135 to protect the bottom surface of the can 10. The bottom cover 135 can be adhered to the can 10 using a double-coated adhesive tape 115. The secondary battery can be covered with an adhesive label (not shown) or a heat-shrinkable label, to form an outer appearance of the secondary battery 100.

Figure 3:
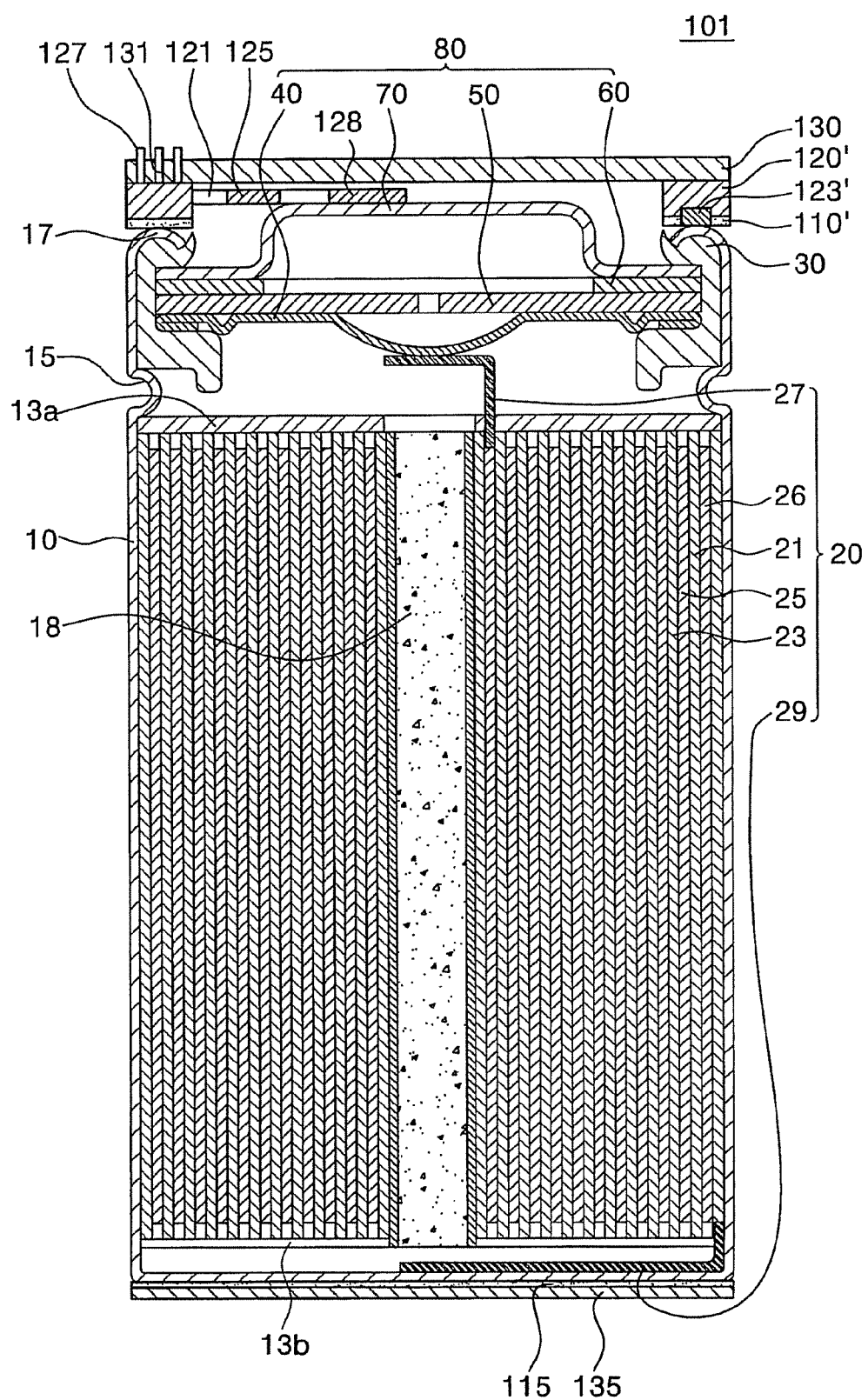
FIG. 3 is a cross-sectional view of a battery pack, according to a second exemplary embodiment of the present invention.
Figure 4:
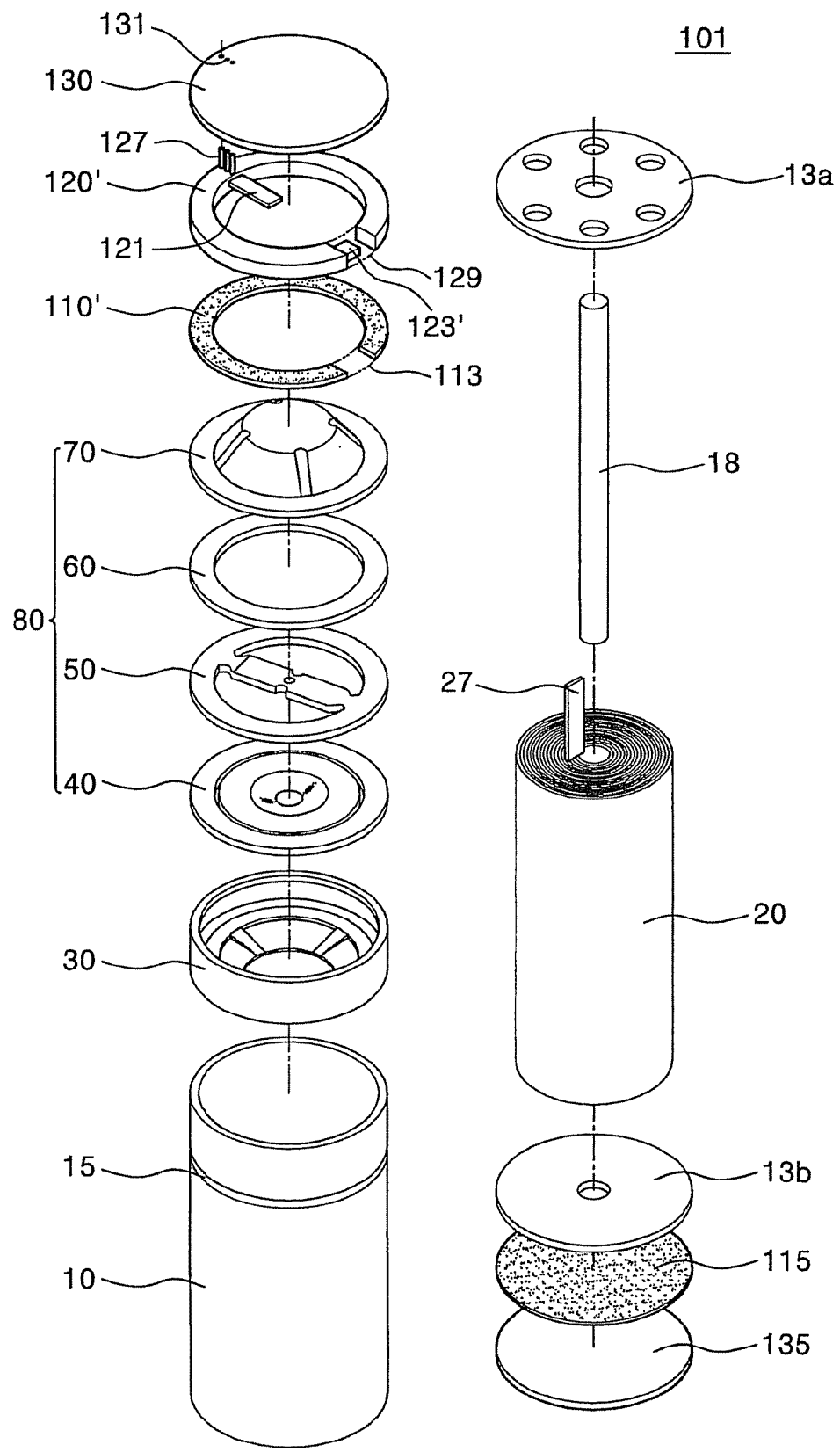
FIG. 4 is an exploded perspective view of the battery pack of FIG. 3.

FIG. 3 is a cross-sectional view of a secondary battery 101, according to a second exemplary embodiment of the present invention; and FIG. 4 is an exploded perspective view of the secondary battery 101. The secondary battery 101 includes elements similar to those of the secondary battery 100, so only the different elements will mainly be described.

A double-coated adhesive tape 110' can be used to attach the can 10 to a protection circuit board 120'. The tape 110' is ring-shaped and has a cut part 113. The protection circuit board 120' is also ring-shaped, has a cut part 129, and includes a second lead 123' that extends into the cut part 129. The second lead 123' is welded to the crimping part 17 of the can 10, through the cut part 113 of the tape 110'. When the second lead 123' is welded to the crimping part 17, the weld is more resistant to external impacts than other parts of the can, and does not affect the appearance of the secondary battery 101.

The secondary batteries 100, 101 include the top and bottom covers 130, 135, and external connection terminals 127 formed on the protection circuit boards 120, 120'. The aspects of the present invention will now be described with a secondary battery that does not include an external cover.

Figure 5:
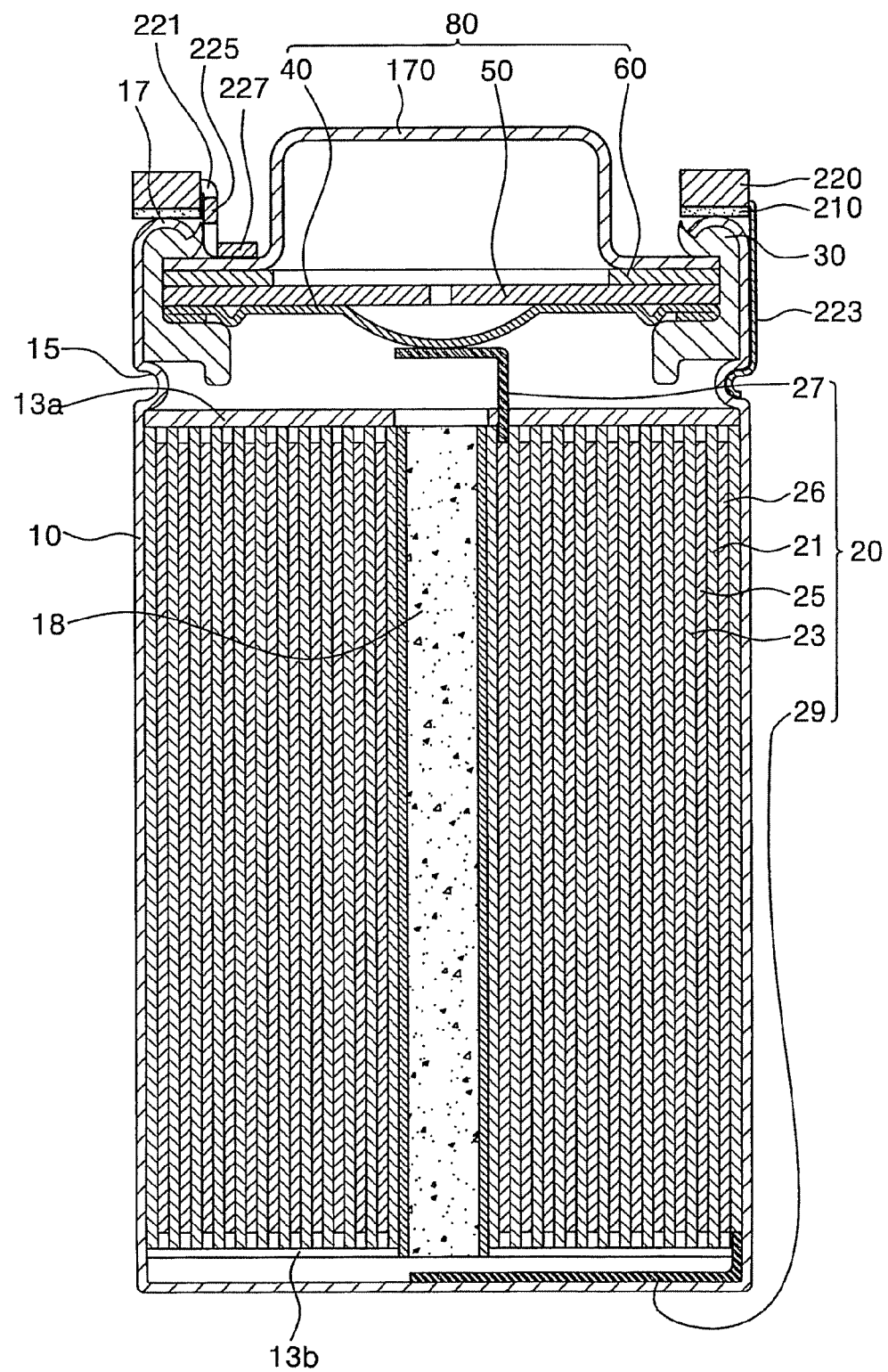
FIG. 5 is a cross-sectional view of a battery pack, according to a third exemplary embodiment of the present invention.

FIG. 5 is a cross-sectional view of a secondary battery 200, according to a third exemplary embodiment of the present invention. The secondary battery 200 includes elements similar to those of the secondary battery 101, so only the different elements will be described in detail. The secondary battery 200 includes a can 10, an electrode assembly 20 disposed in the can 10, a cap assembly 80 to seal the can 10, and a protection circuit board 220 disposed on the can 10.

The cap assembly 80 includes a cap-up 170 that serves as an electrode terminal. The cap-up 170 extends past a top surface of a protection circuit board 220. The protection circuit board 220 is connected to the can 10 by a double-coated adhesive tape 210. That is, the protection circuit board 220 does not include an external connection terminal; instead, the cap-up 170 and the can 10 are used as external connection terminals. In this exemplary embodiment, the cap-up 170 is connected to a first electrode tab 27 and is used as a positive terminal, and the can 10 is connected with a second electrode tab 29 and is used as a negative terminal.

When several secondary batteries are serially connected with one another, the cap-ups are arranged to be in contact with the bottoms of the cans of adjacent secondary batteries. The secondary batteries can be included in a battery pack, which may be convenient.

The protection circuit board 220 is attached to a top surface of the bare cell 200 using a double-coated adhesive tape 210. The cap-up 170 serves as an external connection terminal. The double-coated adhesive tape 210 is ring-shaped, and the cap-up 170 extends there through. The thickness of the tape 210 may be freely chosen, so long as the cap-up 170 extends past the top surface of the protection circuit board 220.

The protection circuit board 220 is attached to the top surface of the double-coated adhesive tape 210, and first and second leads 221 and 223 are disposed to make electrical connections between the electrode assembly 20 and the protection circuit board 220. The protection circuit board 220 is ring-shaped, such that the cap-up 170 projects there through.

The thickness of the protection circuit board 220 may be freely chosen, so long as the cap-up 170 extends past the top surface of the protection circuit board 220. That is, the double-coated adhesive tape 210 and the protection circuit board 220 may have any thicknesses, so long as the cap-up 170 extends past the top surface of the protection circuit board 220, when the components are assembled.

The first and second leads 221 and 223 may be formed of nickel. The first lead 221 projects inwardly from the protection circuit board 220, toward the cap-up 170. The first lead 221 is curved to be attached to the bottom portion of the cap-up 170, by welding. Alternatively, the first lead 221 may be welded to any portion of the cap-up 170, so long as an electrical connection can be established therebetween. The first lead 221 may include a PTC thermistor 225 and a welding part 227.

The second lead 223 projects outwardly from the protection circuit board 220. The second lead 223 is curved to contact a side surface of the can 10, and is welded to a bead 15 formed in the can 10. A double-coated adhesive tape (not shown) may be used to connect the second lead 223 to the can 10.

When the second lead 223 is welded to the bead 15, the weld is well protected from external impacts. Further, the appearance of the secondary battery is not affected by the weld.

Figure 6:
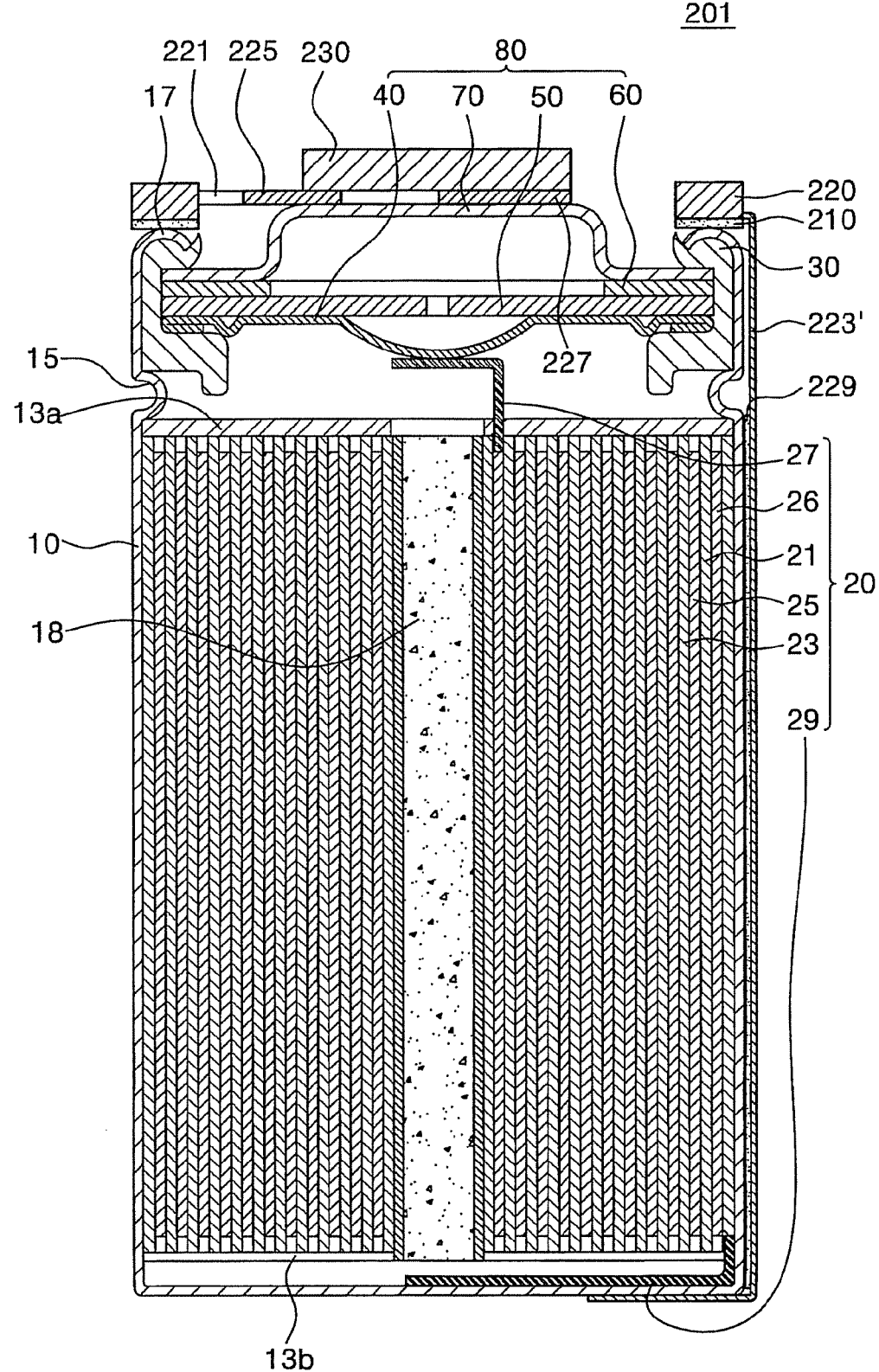
FIGS. 6 and 7 are cross-sectional views illustrating the configurations of secondary batteries according to exemplary embodiments of the present invention.
Figure 7:
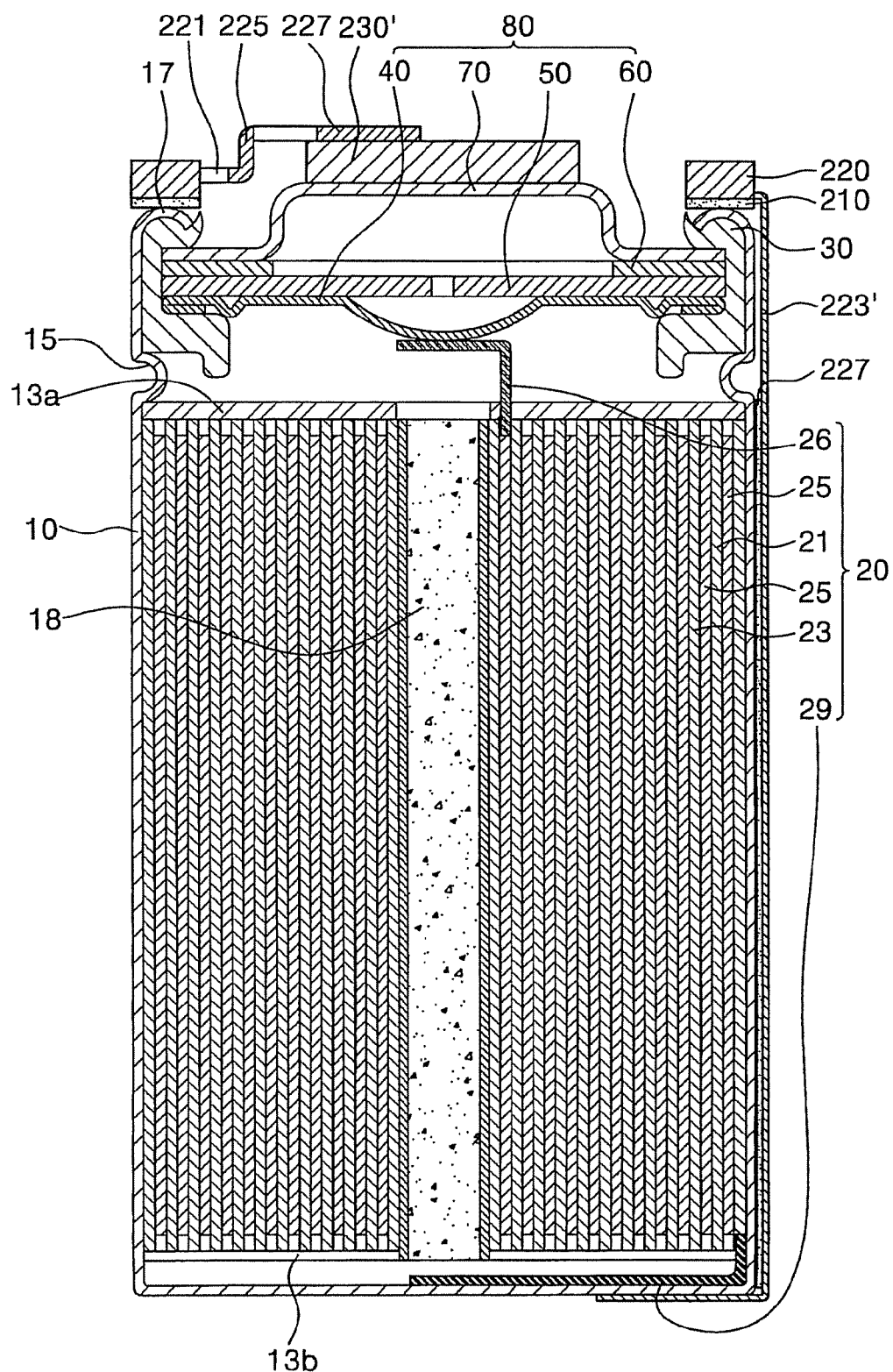

FIGS. 6 and 7 are cross-sectional views illustrating configurations of secondary batteries 201, 202, according to fourth and fifth exemplary embodiments of the present invention. The secondary batteries 201, 202 include elements similar to those of the secondary battery 101, so only the different elements will be described in detail.

Referring to FIGS. 6 and 7, a protection circuit board 220 is attached to a top surface of a can 10 using a double-coated adhesive tape 210. The protection circuit board 220 is attached to a top surface of the double-coated adhesive tape 210, and first and second leads 221 and 223' are disposed to make electrical connection between an electrode assembly 20 and the protection circuit board 220.

The double-coated adhesive tape 210 and the protection circuit board 220 are ring-shaped, and a terminal plate 230 serving as an electrode terminal projects there through. The first and second leads 221 and 223' may be formed of nickel. The first lead 221 projects inwardly from the protection circuit board 220 toward a cap-up 70, and the second lead 223' projects outwardly from the protection circuit board 220.

As illustrated in FIG. 6, the first lead 221 may be a plate that projects from the protection circuit board 220 to an outer surface of the cap-up 170, so as to be welded thereto, by resistance welding. The first lead 221 may alternatively be curved, so as to be welded to an inner surface of the cap-up 70. The first lead 221 may include a PTC thermistor 225, to ensure stability of the secondary battery 201.

After the first lead 221 is welded to the top portion of the cap-up 70, a terminal plate 230 may be further disposed on the first lead 221. The terminal plate 230 may be formed of a highly-conductive material, such as nickel, and may be welded to the first lead 221. However, the material and shape of the terminal plate 230 are not so limited and can be changed and modified in various ways. Accordingly, the terminal plate 230 has the same electrical polarity as the cap-up 70, and can serve as an electrical terminal. The terminal plate 230 is higher than a top surface of the protection circuit board 220.

As described in FIG. 7, after the terminal plate 230' is welded to a top portion of the cap-up 70, a first lead 221' may be disposed on a terminal plate 230'. Of course, the first lead 221' may be welded to any portion of the cap-up 70 and/or the terminal plate 230', so long as the electrode assembly 20 can be electrically connected to the protection circuit board 220.

A second lead 223' may be bent to be in contact with a side surface of the can 10. The second lead 223' may be welded to a bottom portion of the can 10 or may be welded to a bead 15 of the can 10. When the welding is performed at the bead 15, the weld is resistant to external forces. Further, the weld does not affect the appearance of the secondary battery 201. A double-coated adhesive tape 227 may be further included between the second lead 223' and the can 10, to increase the adhesion therebetween. The secondary batteries 201, 202 can be covered by a label, which forms the appearance of the secondary batteries 201, 202.

According to aspects of the present invention, an electrical connection between a protection circuit board and a bare cell may be formed at a bead part or a crimping part formed in a can, thereby protecting the appearance thereof. Further, since an electrode terminal is formed higher than a protection circuit board, by forming a cap-up higher than the protection circuit board or by forming a terminal plate on the cap-up, the secondary battery can be easily connected to other secondary batteries in a battery pack.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A secondary battery, comprising:
   a can;
   an electrode assembly in the can;
   a cap assembly sealing an opening of the can and comprising a cap-up that extends away from the electrode assembly;
   a protection circuit board located on a periphery of the opening of the can and comprising an external connection terminal;
   a double-coated adhesive tape attaching the can to the protection circuit board;
   a first lead extending from the protection circuit board and coupled to the cap-up;
   a second lead extending from the protection circuit board and coupled to a bead of the can such that the second lead is exposed on an exterior surface of the can; and
   a top cover disposed on the protection circuit board, having a terminal hole through which the external connection terminal is exposed.

2. The secondary battery according to claim 1, wherein the double-coated adhesive tape is ring-shaped.

3. The secondary battery according to claim 1, wherein the protection circuit board is ring-shaped.

4. The secondary battery according to claim 1, wherein the first and second leads comprise nickel.

5. The secondary battery according to claim 1, wherein the first lead comprises a positive temperature coefficient thermistor.

6. The secondary battery according to claim 1, wherein the first lead is plate-shaped.

7. The secondary battery according to claim 1, wherein the first lead is welded to an inner or outer surface of the cap-up.

8. A secondary battery comprising:
   a can;
   an electrode assembly in the can;
   a cap assembly sealing an opening of the can and comprising a cap-up that extends away from the electrode assembly;
   a protection circuit board located on a periphery of the opening of the can and comprising an external connection terminal;
   a double-coated adhesive tape attaching the can to the protection circuit board;
   a first lead extending from the protection circuit board and coupled to the cap-up;
   a second lead extending from the protection circuit board and coupled to a crimping part of the can such that the second lead is exposed on an exterior surface of the can; and
   a top cover on the protection circuit board and having a terminal hole through which the external connection terminal is exposed.

9. The secondary battery according to claim 8, wherein the double-coated adhesive tape is ring-shaped and has a cut part.

10. The secondary battery according to claim 8, wherein the protection circuit board is ring-shaped and has a cut part.

11. The secondary battery according to claim 8, wherein the first and second leads comprise nickel.

12. The secondary battery according to claim 8, wherein the first lead comprises a positive temperature coefficient thermistor.

13. The secondary battery according to claim 8, wherein the first lead is plate-shaped.

14. The secondary battery according to claim 8, wherein the first lead is welded to an inner or outer surface of the cap-up.

15. The secondary battery according to claim 8, wherein:
   the double-coated adhesive tape is ring-shaped and has a first cut part;
   the protection circuit board is ring-shaped, has a second cut part; and the second lead is welded to the can through the first cut part and the second cut part.

* * * * *